INVENTORS.
FOREST G. NICCUM
WALTER J. KUDLATY
BY Parker & Carter
Attorneys.

United States Patent Office 3,334,747
Patented Aug. 8, 1967

3,334,747
IN-LINE FILTER STRUCTURE
Forest G. Niccum, Wood Dale, and Walter J. Kudlaty, Elmhurst, Ill., assignors to Marvel Engineering Company, Chicago, Ill., a corporation of Illinois
Filed Feb. 24, 1965, Ser. No. 434,949
1 Claim. (Cl. 210—130)

ABSTRACT OF THE DISCLOSURE

A filter structure in which a filter element and a combination apertured-spacer-and-by-pass-valve assembly are joined to position the element in a housing, to insure a filtering path for incoming fluid and to provide for by-passing said path when the filter element becomes clogged, the assembly being removable from the element to permit economic substitution of a new element with the assembly.

---

This invention relates to a filtering structure assembly wherein a cartridge within a housing is disposed for in-line filtering with a fluid inlet.

An object of the invention is a filtering structure having a cartridge within a housing positioned for in-line filtering, and said cartridge being positioned in spaced relationship to the inlet by a by-pass valve assembly which retains a free path of travel for fluid to be filtered between the inlet and the end of the cartridge.

Another object is a filtering structure having a housing and a cartridge within the housing positioned in line with an inlet of the housing, and said housing spaced a fixed position from the inlet end of the housing by a by-pass assembly in which a by-pass valve opens against urging means to let fluid by-pass the filter when its filtering capacity is impeded by soiling and the like.

Another object is a filtering structure having a housing containing a cartridge positioned in line with an inlet of the housing, and said cartridge spaced in a fixed position from the housing inlet by a by-pass valve assembly which permits the by-pass valve to be responsively connected to an external signal so that movement of the by-pass valve against urging means may be reported.

Figure 1:
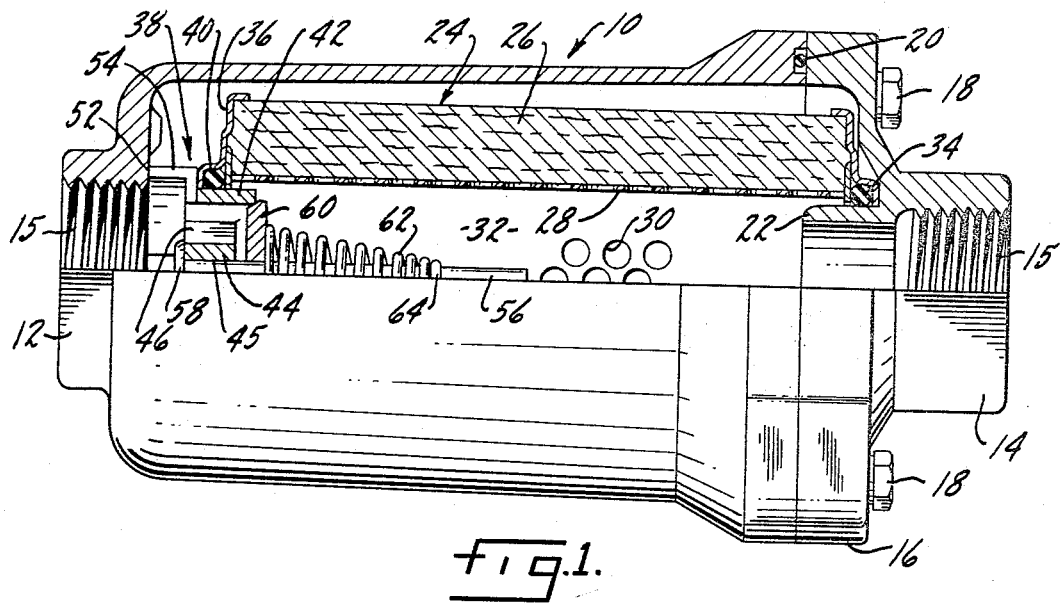
Figure 2:
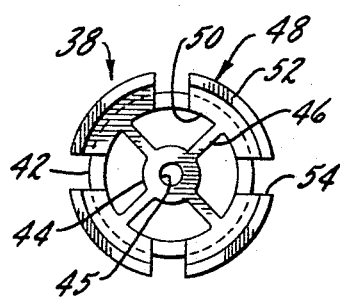

The foregoing objects are attained together with other objects which will become apparent from considering the following disclosure which includes drawings, wherein:

FIGURE 1 is a side elevational view, partly in section, of the filtering structure; and FIGURE 2 is a front elevational view of the spacer unit partly shown in FIGURE 1.

The use of the same numerals in the various views will indicate the same structures and elements.

In FIGURE 1 an elongated housing, shown generally as 10, is seen with an inlet 12 at one end and in outlet 14 at the opposed end. The inlet and outlet ends are seen threaded as at 15 so that an interlock may be formed with a line which conveys the fluid which is to undergo a filtering operation. The outlet is in a cover 16 which is held in place by a locked bolt such as 18. A seal such as 20 may be provided between the cover and the body of the housing to prevent leakage. The cover may also be provided with an annular projection 22 extending inwardly, which projection may be used to help position a cartridge shown generally as 24 within the housing.

The cartridge itself is of the general type used in this art, and is shown as being elongated with a continuous filtering surface 26. The inside of the filter surface is usually faced by a substantially rigid mesh such as 28 having a plurality of openings such as 30 through which passes the filtered fluid into the core of the cartridge shown generally at 32. The filtered fluid passes from the core through an annular projection 22 and out of outlet 14. It is seen that the annular projection 22 is seated within the core to thereby more securely position the cartridge at the outlet end of the housing. A ring seal 34 may be provided at one end of the cartridge to provide a sealing engagement with the annular projection 22.

It will be seen that end 36 of the cartridge is spaced a set distance from the inlet end of the housing. The embodiment of FIGURE 1 shows a by-pass valve associated with the cartridge and, therefore, the means to space the cartridge from the inlet end of the housing includes a by-pass valve assembly shown generally at 38. The valve assembly is inserted into the core 32 of the cartridge and is frictionally engaged with ring seal 40 of the cartridge to prevent leakage.

The illustrated valve assembly is seen to have a body section with continuous wall 42, preferably circular to fit the core of the cartridge. The continuous wall is joined to a centrally located annulus 44 by a well formed of a plurality of radial arms such as 46. Connected to an edge of the continuous wall are a plurality of raised arcuate parts shown generally as 48. Each part is shown with an arcuate radial or annular portion 50 from which an arcuate axially extending portion or finger 52 extends. Adjacent arcuate parts are spaced from one another to define slotted passageways 54 which provide a pathway for fluid to be filtered. The arcuate parts are dimensioned so that the surface of the portion 50, opposite that from which finger 52 extends, abuts the end 36 of the cartridge to thereby space the end of the cartridge a predetermined distance from the inlet end of the housing.

The annulus 44 is seen to receive a rod 56 which is restrained from lateral travel towards the outlet end of the housing by head 58. The by-pass valve 60 is slidable on the rod and is normally urged against the opposite edge of wall 42 to close the passageways between the arms 46 of the body section by a spring 62 which has its smallest turns restrained by abutment 64 fixed to the rod.

Fluid entering the inlet will normally pass through the slotted passageways 54 between the arcuate sections and then pass through filtering surface 26 of the cartridge but, when the cartridge becomes soiled sufficiently to resist a given rate of filtration, the pressure from the accumulated fluid will move by-pass valve element 60 to open a passageway between arms 46 so that fluid will enter directly into the core and out of the housing outlet.

The by-pass valve assembly shown in FIGURE 1 is set for a by-pass valve which is urged by interior means to a closed position. Exterior urging means may, however, be provided to bias the by-pass valve to a closed position, and such exterior means may include a spring associated with exterior signal means to report the extent to which the by-pass valve has moved away from its normally closed position. Such an exterior urging means and indicator may be seen in copending application, Ser. No. 403,157 filed Oct. 12, 1964.

The use and operation of our invention are as follows:

When setting up a filtering structure for an operation with a by-pass valve, a spacer unit such as 38 is inserted into the core of the cartridge at the end which will be first inserted into the housing. When the cartridge is fully inserted with the spacer unit in place, that end of the housing will be set in fixed position as the fingers 52 contact the inside of the housing at the inlet end. The other end of the cartridge may be variously positioned to the housing at the outlet end when the cover 16 is mounted in place. An annular projection 22 extending inwardly has been shown to be seated within the core of the cartridge at the outlet end. Other means may be provided such as positioning lugs or a plurality of projections on the inside of the cover which frictionally register with recesses provided in the end of the cartridge.

It is seen that the spacer unit permits elongated cartridges to be employed having a by-pass valve which may be variously urged to closed position, such as by an interior spring 62 placed on a rod 56, or it may be placed outside of the housing. Variously designed spacer units may operate within the scope of the invention and it is merely required that such spacer units have a body section with a continuous wall to be seated within the core and to provide a passageway which can be opened and closed by a by-pass valve such as 60. It is additionally required that such spacer units have projections or fingers such as 52 of a predetermined length extending toward the inlet end of the housing so that the distal end of the finger can contact the inside of the inlet end of the housing and the proximal end of the finger can be positioned against the cartridge.

The spacer unit may be otherwise modified such as by providing an annulus 44 with a central passageway 45 to hold a rod. Such an annulus may be dispensed with and the rod may extend out of the housing and be associated with a spring outside the housing to urge the valve to a closed position. Appropriate associated elements may be provided outside the housing to provide working surfaces against which the spring may act.

The foregoing invention can now be practiced, and such practitioners will know the invention is not necessarily restricted to the particular embodiments presented herein. The scope of the invention is to be defined by the terms of the following claim as given meaning by the preceding description.

We claim:

An in-line filter structure assembly including an elongated housing, an inlet port at one end of the housing, an outlet port at the opposite end, a replaceable filtering cartridge within the housing, said cartridge having a length shorter than the housing, a core within the cartridge, a tubular projection extending inwardly from said opposite end, said tubular projection adapted to be positioned within the core for partially positioning the cartridge within the housing, a by-pass valve spacer assembly positioned between an end of the cartridge and the inlet end of the housing, said by-pass valve spacer assembly having a continuous wall enclosing a passageway, said continuous wall adapted to be removably positioned within the core of the cartridge, a plurality of projections extending from the continuous wall toward the inlet end of the housing, said projections including arcuate parts, one part spaced from another so that a path of travel is defined therebetween for the fluid entering the housing from the inlet, the arcuate parts being of predetermined length so that they contact the inside of the housing adjacent and about the inlet port and thereby space the end of the cartridge a predetermined distance from the end of the inlet housing, said arcuate parts including radial portions abutting said cartridge end, said assembly including a rod member, a valve element carried on said rod member for seating on said continuous wall to close said passageway and a spring having an operating engagement with said rod and valve element to urge said valve element toward said wall.

References Cited

UNITED STATES PATENTS

| 2,389,814 | 11/1945 | Pond et al. | 210—448 X |
| 2,793,752 | 5/1957 | Jay | 210—448 X |
| 3,072,260 | 1/1963 | Szwargulski et al. | 210—446 X |

FOREIGN PATENTS

| 678,486 | 1/1964 | Canada. |
| 841,818 | 7/1960 | Great Britain. |
| 932,926 | 7/1963 | Great Britain. |

SAMIH N. ZAHARNA, *Primary Examiner.*